US012784441B2

(12) United States Patent
Sugawara et al.

(10) Patent No.: US 12,784,441 B2
(45) Date of Patent: Nov. 3, 2026

(54) DETERIORATION PREDICTION DEVICE, DETERIORATION PREDICTION METHOD, AND RECORDING MEDIUM

(71) Applicant: NEC Corporation, Tokyo (JP)

(72) Inventors: Chisato Sugawara, Tokyo (JP); Toshimichi Yokote, Tokyo (JP); Yosuke Kimura, Tokyo (JP); Yusuke Mizukoshi, Tokyo (JP); Takakazu Ishii, Tokyo (JP); Hiromichi Hirata, Tokyo (JP); Shouhei Ohno, Tokyo (JP); Nana Jumonji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 18/723,506

(22) PCT Filed: Dec. 28, 2021

(86) PCT No.: PCT/JP2021/048771
§ 371 (c)(1),
(2) Date: Jun. 24, 2024

(87) PCT Pub. No.: WO2023/127089
PCT Pub. Date: Jul. 6, 2023

(65) Prior Publication Data
US 2024/0404275 A1 Dec. 5, 2024

(51) Int. Cl.
*G06V 20/10* (2022.01)
*G06T 7/00* (2017.01)
(Continued)

(52) U.S. Cl.
CPC .......... *G06V 20/176* (2022.01); *G06T 7/0004* (2013.01); *G06T 7/50* (2017.01); *G06T 11/65* (2026.01); *G06T 2207/30132* (2013.01)

(58) Field of Classification Search
CPC ....... G06V 20/176; G06T 7/0004; G06T 7/50; G06T 11/60; G06T 2207/30132; G06Q 10/06
See application file for complete search history.

(56) References Cited

U.S. PATENT DOCUMENTS

2017/0161628 A1* 6/2017 Chiba .................... G06F 17/18
2017/0359525 A1* 12/2017 Weil ..................... G06T 7/0004
(Continued)

FOREIGN PATENT DOCUMENTS

JP 2019057192 A * 4/2019 ............. G06Q 50/08
JP 2019185443 A * 10/2019 .............. G08G 1/00
(Continued)

OTHER PUBLICATIONS

International Search Report for PCT Application No. PCT/JP2021/048771, mailed on Mar. 29, 2022.
(Continued)

*Primary Examiner* — Wesley J Tucker
(74) *Attorney, Agent, or Firm* — Sughrue Mion, PLLC

(57) ABSTRACT

A deterioration prediction device according to the present disclosure is provided with: a sensor history information acquisition means that acquires sensor history information of a structure; a strata information acquisition means that acquires strata information of the ground under the structure; a deterioration prediction means that predicts the deterioration state of the structure at a future point in time on the basis of the sensor history information and the strata information; and an output means that outputs the deterioration prediction result of the structure.

10 Claims, 11 Drawing Sheets

(51) Int. Cl.
*G06T 7/50* (2017.01)
*G06T 11/65* (2026.01)

(56) References Cited

U.S. PATENT DOCUMENTS

| | | | | |
|---|---|---|---|---|
| 2020/0025957 | A1* | 1/2020 | Guo | E04H 9/02 |
| 2021/0223389 | A1* | 7/2021 | Ikefuji | G01S 13/9058 |
| 2022/0262111 | A1* | 8/2022 | Yamasaki | G06V 20/588 |
| 2023/0108134 | A1* | 4/2023 | Jumonji | G06T 7/0004 702/34 |
| 2023/0298207 | A1* | 9/2023 | Tatsuno | G06T 7/74 345/419 |
| 2024/0026615 | A1* | 1/2024 | Jumonji | E01C 23/01 |
| 2024/0337498 | A1* | 10/2024 | Sugawara | G01C 21/3461 |
| 2024/0346831 | A1* | 10/2024 | Sugawara | G06V 20/58 |
| 2025/0054122 | A1* | 2/2025 | Sugawara | G06Q 50/08 |
| 2026/0049890 | A1* | 2/2026 | Kim | G01M 5/0066 |

FOREIGN PATENT DOCUMENTS

| | | | |
|---|---|---|---|
| JP | 2020-077322 | A | 5/2020 |
| WO | 2021/192790 | A1 | 9/2021 |

OTHER PUBLICATIONS

English translation of Written opinion for PCT Application No. PCT/JP2021/048771, mailed on Mar. 29, 2022.

* cited by examiner

DETERIORATION PREDICTION DEVICE, DETERIORATION PREDICTION METHOD, AND RECORDING MEDIUM

This application is a National Stage Entry of PCT/JP2021/048771 filed on Dec. 28, 2021, the contents of all of which are incorporated herein by reference, in their entirety.

TECHNICAL FIELD

The present disclosure relates to a deterioration prediction device, a deterioration prediction method, and a recording medium.

BACKGROUND ART

Structures such as roads or runways need to be repaired due to deterioration over time. There is a technique for predicting deterioration states of structures in order to plan repair of the structures.

For example, PTL 1 discloses a structure inspection support system that analyzes a deterioration status of a structure and generates data of a prediction value of a future deterioration level.

CITATION LIST

Patent Literature

PTL 1: JP 2019-057192 A

SUMMARY OF INVENTION

Technical Problem

However, in large structures such as roads, bridges, or runways, in a case in which a displacement occurs in a ground (surface layer stratum) that affects the entire structure, surface deterioration such as cracks occurs. This surface deterioration occurs separately from displacement caused by deterioration of a structure itself such as deterioration (individual deterioration) of a surface member. Therefore, it is necessary to predict the deterioration state of the structure in consideration of not only the individual deterioration but also the deterioration associated with the displacement of the ground.

There are various kinds of ground, and the progress of displacement such as ground sinking varies depending on the type. The structure inspection support system described in PTL 1 uses sensor history information or regional characteristic information to determine a deterioration level of a structure. However, since the ground structure greatly varies depending on the location even in the same region, it is difficult to appropriately predict the deterioration state of the structure.

An example of an object of the present disclosure is to provide a deterioration prediction device and the like which can appropriately predict the deterioration state of the structure.

Solution to Problem

A deterioration prediction device according to an aspect of the present invention includes a sensor history information acquisition means that acquires sensor history information of a structure, a stratum information acquisition means that acquires stratum information of a ground under the structure, a deterioration prediction means that predicts a deterioration state of a structure at a future time point based on the sensor history information and the stratum information, and an output means that outputs the deterioration prediction result of the structure.

A deterioration prediction device method according to an aspect of the present invention includes acquiring sensor history information of a structure, acquiring stratum information of a ground under the structure, predicting a deterioration state of the structure at a future time point based on the sensor history information and the stratum information, and outputting a deterioration prediction result of the structure.

A recording medium according to an aspect of the present invention has a program recorded therein, and the program causes a computer to execute acquiring sensor history information of a structure, acquiring stratum information of a ground under the structure, predicting a deterioration state of the structure at a future time point based on the sensor history information and the stratum information, and outputting a deterioration prediction result of the structure.

Advantageous Effects of Invention

An example of an effect of the present disclosure lies in that it is possible to appropriately predict the deterioration state of the structure.

EXAMPLE EMBODIMENT

Figure 1:
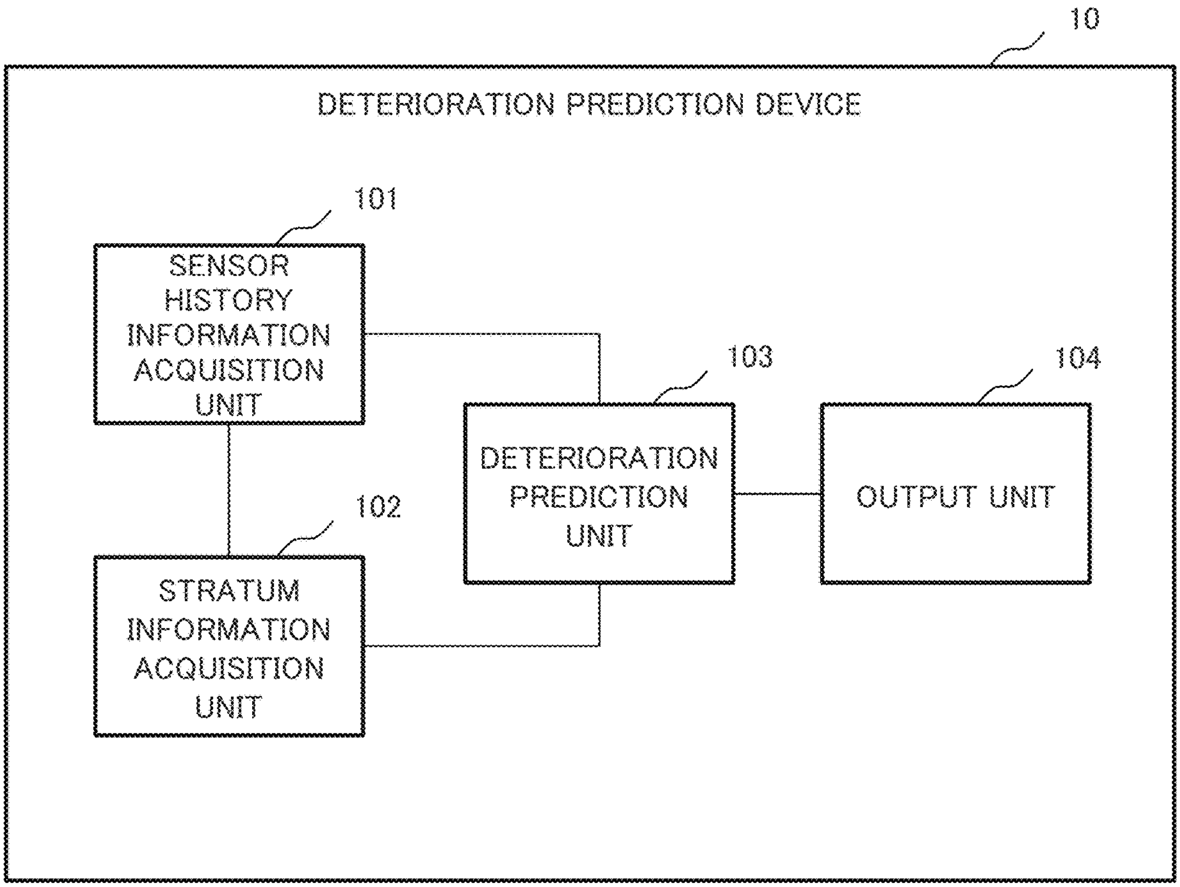
FIG. 1 is a block diagram illustrating an example of a configuration of a deterioration prediction device according to a first example embodiment.

Next, example embodiments of the present invention will be described with reference to the drawings. The drawings are for describing the example embodiments of the present invention. However, the example embodiments of the present invention are not limited to the description of the drawings. Similar configurations in the drawings are denoted by the same reference numerals, and repeated description thereof may be omitted. In the drawings used in the following description, configurations of portions not related to the solution of the problem of the present invention may be omitted and not illustrated.

First Example Embodiment

FIG. 1 is a block diagram illustrating an example of a configuration of a deterioration prediction device 10 according to a first example embodiment. The deterioration prediction device 10 includes a sensor history information acquisition unit 101, a stratum information acquisition unit 102, a deterioration prediction unit 103, and an output unit 104. Each configuration may store at least a portion of information specified by each configuration, acquired information, and determined information in a storage unit (not illustrated). In this case, each configuration may acquire necessary information from the storage unit. The deterioration prediction device 10 is a device that predicts the deterioration state of the structure based on sensor history information acquired from a sensor history information acquisition device and stratum information of ground under the structure. Examples of the structure include civil engineering structures such as roads, bridges, slope protection works, embankments, piers, revetments, or runways.

Figure 2:
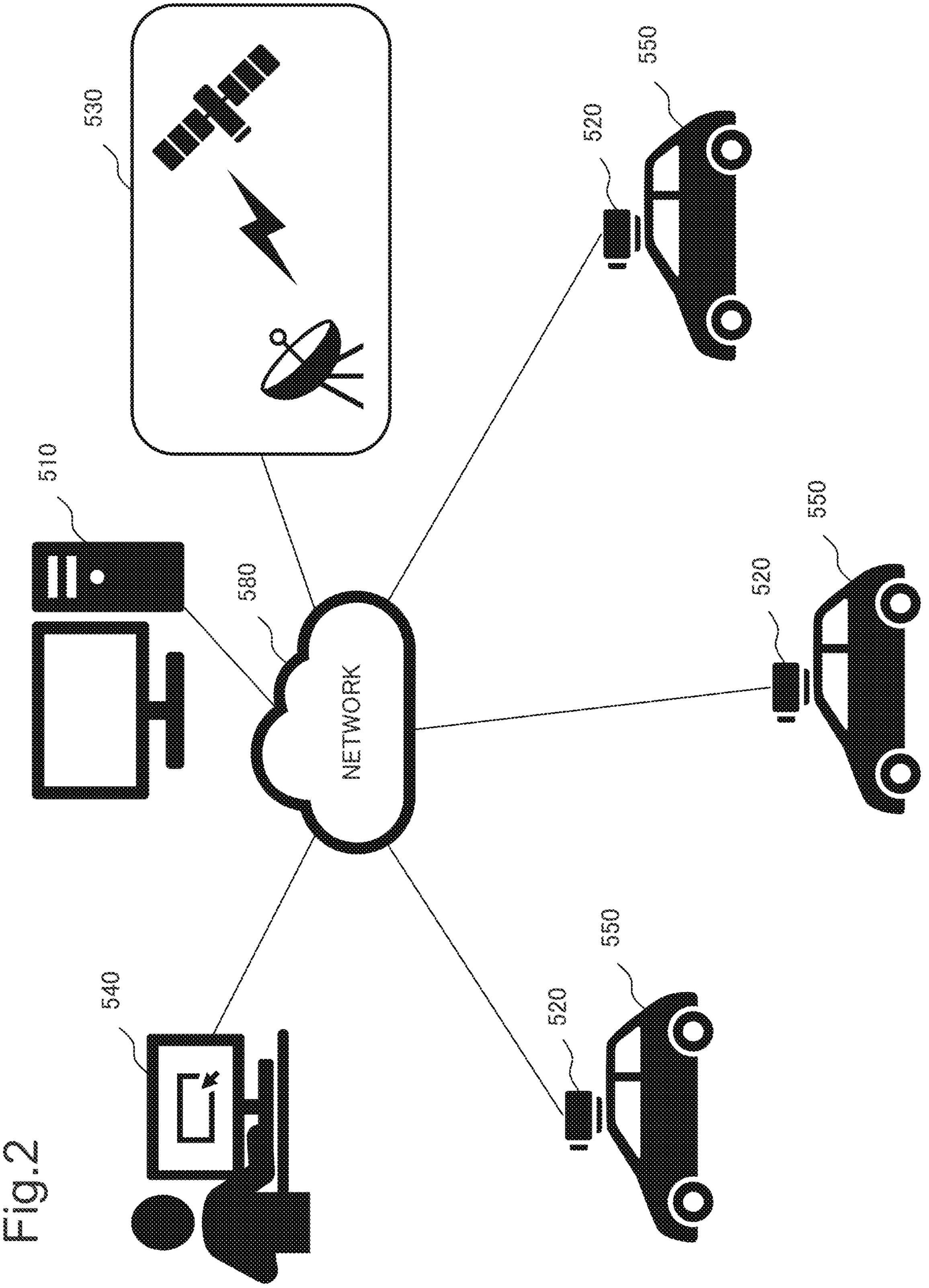
FIG. 2 is a conceptual diagram illustrating an example of a configuration of the deterioration prediction device and its surroundings according to the first example embodiment.

FIG. 2 is a conceptual diagram illustrating an example of a configuration of the deterioration prediction device 10 and its surroundings according to the first example embodiment. As illustrated in FIG. 2, the deterioration prediction device 10 is used as a system including a computer 510, a drive recorder 520 as an example of the sensor history information acquisition device, a synthetic aperture radar system (hereinafter referred to as "SAR") 530 as an SAR, a terminal device 540 as an example of a display device, and a vehicle 550 as an example of a mobile object. However, in the present example embodiment, the SAR 530 is not an essential component. A network 580 is a communication path that connects devices and systems to each other. The deterioration prediction device 10 (the computer 510) and the drive recorder 520 may be directly connected to each other, but may be connected to each other via a network or the like.

The drive recorder 520 outputs the sensor history information to a database (not illustrated). The sensor history information refers to accumulated data of information acquired from a sensor in order to determine a situation of the structure and a situation around the structure. Examples of the sensor include a camera, a speedometer, and an accelerometer. The drive recorder 520 is mounted, for example, on a mobile object and acquires sensor information. Examples of the mobile object include a vehicle and a drone. The sensor information may be acquired using a fixed camera attached to the mobile object, a camera brought into the mobile object by a person or the like, or a fixed camera installed on a road instead of the drive recorder 520. A fixed camera such as an all-sky camera or an in-vehicle camera attached to the mobile object may be used instead of the drive recorder 520. The sensor information may be acquired using a camera mounted on a smartphone or a tablet brought into the mobile object by a person or the like or a fixed camera installed on a road.

The SAR 530 is a radar system in which flying objects such as artificial satellites or aircrafts transmit and receive radio waves while moving, and obtain an image equivalent to that in the case of an antenna having a large opening. The SAR 530 outputs a measurement image (SAR image) or a ground surface displacement to the deterioration prediction device 10.

The terminal device 540 displays a deterioration prediction result of the structure output by the deterioration prediction device 10. The terminal device 540 may be any device as long as it can display the deterioration prediction result of the structure. The terminal device 540 may be, for example, a terminal device of a road administrator such as a local government.

The number of configurations included in FIG. 2 is an example. For example, the number of drive recorders 520 may be one or more. Alternatively, at least some of the drive recorders 520 may not be mounted on the vehicle 550. In FIG. 2, the drive recorder 520 is displayed outside the vehicle 550 for easy understanding. However, the drive recorder 520 may be mounted inside the vehicle 550.

Returning to FIG. 1, the sensor history information acquisition unit 101 acquires the sensor history information of the structure. The sensor history information refers to information in which the sensor information from the past to the present is accumulated, and is stored in the database (not illustrated). The sensor history information acquisition unit 101 acquires the sensor history information from the database. The sensor information may be accumulated in the sensor history information acquisition device. In this case, the sensor history information acquisition unit 101 may directly acquire the sensor history information from the sensor history information acquisition device. The sensor history information acquisition unit 101 acquires the sensor history information in a certain period with detection of an operation of starting deterioration prediction of the structure by the user as a trigger. In a case in which the history information of the image data is acquired as the sensor history information, the sensor history information acquisition unit 101 acquires information on a date and time when each piece of image data is acquired and a position where each piece of image data is captured together with the history of the image data. Examples of the position information include a position on a map, latitude and longitude, and position information by global navigation satellite system (GNSS), or global positioning system (GPS). The sensor history information acquisition unit 101 may acquire information at the time of sensor acquisition such as brightness/darkness, presence/absence of a shadow, presence/absence of back light, or ambient weather together with the sensor history information.

The stratum information acquisition unit 102 acquires the stratum information of the ground under the structure. The ground refers to a surface layer portion of the ground surface supporting the foundation of the structure. The stratum information acquisition unit 102 acquires stratum information of the ground where the structure of the deterioration prediction target exists from, for example, a public database or the like.

The stratum information includes developed land information, surface layer stratum, soil information, or topographical information. The developed land information refers to construction information applied to land for the purpose of developing non-residential land to a residential land or the like. The developed land information includes, for example, embankments such as existing embankments, embankments with added fill, valley filling, a natural ground, and non-filled embankments. The surface layer stratum is a stratum deposited near the ground surface. The surface layer stratum includes information indicating geological names such as low wetland deposits, natural levees, sandbar deposits, Imai layers, Kakiu layers, Musashino loam layers, Musashino gravel layers, Koharadai sand and gravel layers, Zengyo gravel layers, Shimomatsuyoshi loam layers, Shimomatsuyoshi layers, Hayata loam layers, Maioka loam layers, and Tsurumi layers or stratum eras such as the Middle and Late Pleistocene, the Early Pleistocene, the Pliocene, the late Pleistocene, and the Quaternary period. Examples of the soil information include soil types such as immature sand dunes, black volcanic ash soil, brown lowland soil, gray lowland soil, rock debris soil, dark red soil, artificially modified soil, and artificially modified land soil or soil properties such as fine sand, coarse sand, and silt, clay. A stratum or soil which is likely to contain water such as silt or clay is mostly weak. The topographical information includes natural landforms such as loam (volcanic ash) plateaus, debris flow deposition areas, mountain slopes, former water bodies, old river channels, lowered areas, riverbanks and floodplains, wetlands, present water bodies, sandy and gravelly plains, natural levees, valley bottoms, and foot slope debris faces/cliff cones or artificial landforms such as artificial flatlands, cut lands, landfill sites, embankment sites, and gravel extraction sites.

The stratum information may include information related to land and soil other than the stratum. For example, an (average) slope angle, designation of steep slope areas, annual precipitation, rainwater infiltration pits, lowlands prone to drainage difficulties, zones at risk of soil and debris disasters, liquefaction hazard levels, susceptibility to shaking, designated areas for soil and debris disaster caution, land use types, and registered land categories are included. It is possible to detect the weakness of the ground from these pieces of information. Examples of the land use type include high-rise buildings, low-rise buildings, densely populated areas of low-rise buildings, public facilities, factories, exhibition halls, parking lots, parks and green spaces, forests, vacant lots, roads, railways, rivers, lakes, and coastlines. Examples of the registered land categories include residential land, rice fields, vegetable fields, pastures, wilderness areas, salt fields, springs, ponds, forests, graveyards, shrine grounds, canal land, water supply land, drainage channels, reservoirs, embankments and ditches, security forests, public roads, parks, railway land, school land, and miscellaneous land. For example, lowlands often seen in the vicinity of rivers, ponds, and the like are mostly weak.

The stratum information acquisition unit 102 may acquire chronological information (stratum history) of the stratum as the stratum information. For example, a state of soil before and after development in the developed land, a change or movement in a watershed of a river in the past, a development/change plan of the ground surface, a development plan, an improvement plan, a surrounding construction plan such as a construction plan of an underground tunnel or a construction plan of a large building, and the like may be associated. The strata that were river basins in the past are mostly weak. The number of stratum information used by the deterioration prediction unit 103 may be one or more. The stratum information used by the deterioration prediction unit 103 may be fixed, but may be randomly designated by the user.

The deterioration prediction unit 103 predicts the deterioration state of the structure at a future time point based on the sensor history information and the layer information which are respectively input from the sensor history information acquisition unit 101 and the stratum information acquisition unit 102. First, the deterioration prediction unit 103 predicts a baseline deterioration state of the structure at a certain future time point using a learned model generated by machine learning. This learned model is, for example, a model generated by using sensor history information at a plurality of past time points such as images obtained by imaging the structure or acceleration as training data, and outputs deterioration prediction of the structure with respect to the sensor history information. The deterioration prediction unit 103 may predict the baseline deterioration state of the structure using, for example, a statistical prediction method such as an autoregressive model, a moving average method, or an exponential average method. The deterioration prediction unit 103 may predict the baseline deterioration state at a future time point based on the baseline deterioration rate of each structure calculated from the sensor history information. That is, the baseline deterioration state at a future time point is a deterioration state predicted based only on the sensor history information.

Next, the deterioration prediction unit 103 predicts the deterioration state of the structure at a future time point by adding the stratum information of the ground under the structure to the baseline deterioration state predicted as described above. Specifically, the deterioration prediction unit 103 predicts the deterioration state in consideration of the fact that the deterioration rate of the structure differs depending on the stratum information of the ground under the structure. For example, when the stratum information is a weak stratum, the deterioration rate becomes higher. In this case, the deterioration prediction unit 103 predicts that the deterioration state progresses more than the baseline. On the other hand, when the stratum information is a hard stratum, the deterioration rate is equivalent to the baseline deterioration rate. In this case, the deterioration prediction unit 103 predicts that the deterioration state is equivalent to the baseline. However, the method of predicting the deterioration state by the deterioration prediction unit 103 is not limited to this example. For example, the deterioration prediction unit 103 may generate a model in which the sensor history information, the stratum information, and the actual deterioration state at a future time point are generated as the training data, and predict the deterioration state of the structure at the future time point based on the generated model. This model is a model that outputs the deterioration state of the structure at a future time point when the sensor history information and the stratum information are input.

In a case in which the deterioration state of the road as the structure is predicted, the deterioration prediction unit 103 uses an index representing the deterioration level of the road. Here, the index representing the deterioration level of the road will be described. There are a plurality of types of road deterioration. The road deterioration is classified into a plurality of types including, for example, cracks, potholes, rutting, and abnormalities in road flatness. The cracks may be classified into different types of linear cracks and alligator cracks depending on their shapes. The linear crack refers to a single linear crack. The alligator crack refers to, for example, a tortoise-shell shaped crack generated when vertical and horizontal linear cracks are connected or the like. The cracks in the roads generally have a tendency to progress in the order of linear cracks, alligator cracks, and potholes. For example, the deterioration prediction unit 103 may predict an occurrence time of the pothole based on the sensor history information of the road and the stratum information of the ground.

A cracking rate is represented by any one of a shape, a length, an area, and the number of cracks, or a combination thereof. The cracking rate is an example of the degree of cracking. The cracking rate is represented by, for example, 100×(crack area/road section area). In this case, the value of the deterioration level ranges from 0% to 100%. The crack area is calculated by a certain method. A method of calculating the cracking rate is not particularly limited, and a known calculation method can be applied in addition to the above described method.

The size of the pothole is represented by, for example, any one of an area, a width, a length, and a depth of the pothole, or a combination thereof. A rutting amount refers to a depth of depression which is continuous in a road length direction generated at the wheel passage positions (a rutting portion) of the vehicle due to a traffic load.

The cracking rate, the number and size of potholes, and the rutting amount may be calculated based on measurement data obtained by measuring the road surface with a sensor. Alternatively, these indices may be calculated based on a recognition result of recognizing road deterioration from an image obtained by imaging the road.

Flatness may be represented by an International Roughness Index (IRI). The IRI is an index in which the road surface and the ride comfort of the driver are associated with each other, and represents the degree of unevenness by a numerical value. The IRI may be calculated based on measurement data obtained by measuring the road surface with a sensor. Alternatively, the IRI may be calculated based on a value of an acceleration sensor attached to the vehicle during travel. Specifically, for example, the IRI is calculated based on a value of acceleration in the vertical direction included in acceleration acquired at a detection position. The method of calculating the IRI is not limited to the above example, and a known calculation method can be adopted.

The deterioration level is not limited to the above-described index, and for example, any index representing road deterioration including a maintenance control index (MCI) may be used. The value of the MCI is the minimum value of the result of calculating four definitional equations using the cracking rate, the rutting amount, and the flatness. The MCI decreases as the road deteriorates. In a case in which the structure is the runway, a Boeing bump index (BBI), which is an index indicating flatness, can be used.

The deterioration prediction unit 103 predicts the deterioration rate, as will be described below, using the above-described index, and predicts the deterioration level based on the deterioration rate. For example, a stratum containing soils prone to water retention, such as silt or clay, may expand (freeze) due to freezing inside the stratum, and cracks may occur on the surface of the structure. Therefore, in a case in which the stratum prone to water retention is included as the stratum information, the deterioration prediction unit 103 predicts that the cracking rate (deterioration rate) of the structure due to freezing increases. On the other hand, stratums with low moisture content or good drainage property such as a sand stratum, a gravel stratum, and a bedrock are hardly affected by freezing. In this case, the deterioration prediction unit 103 predicts that the deterioration rate of the structure due to freezing is not affected. In a case in which a stratum prone to variation under heat or pressure is included, the deterioration prediction unit 103 predicts that the cracking rate of the structure due to expansion and compression inside the stratum would increase.

In a case in which an embankment is included as the stratum information, there is a possibility of ground sinking due to the embankment or a weak stratum of the embankment. That is, the ground in which the embankment is constructed in the valley or the slope is likely to sink due to the weight of the soil of the embankment itself. In addition, in a case in which construction debris such as glass is mixed in the soil used for the embankment, the ground is weak, and there is a possibility of ground sinking. Therefore, the deterioration prediction unit 103 predicts that the deterioration rate of the structure is higher than the baseline deterioration rate in accordance with the stratum information of the ground of the land in which the embankment is constructed.

The deterioration prediction unit 103 may further use information regarding the environment of the structure acquired from an external database when predicting the deterioration level. The external database includes, for example, weather data or traffic data. The weather data includes, for example, precipitation amount information or temperature information disclosed on a website of the Meteorological Agency or the like. The deterioration prediction unit 103 predicts the deterioration level in consideration of the information on the environment of the structure and the difference in the deterioration rate of the deterioration. For example, the deterioration prediction unit 103 predicts that the deterioration rate is higher than the baseline due to the influence of the precipitation amount or the temperature in the region where the precipitation amount is large or the region where the temperature is extremely low. For example, the deterioration prediction unit 103 predicts that roads or bridges with a large traffic volume have the deterioration rate higher than the baseline due to the influence of the traffic volume.

The deterioration prediction unit 103 may predict the deterioration level in consideration of the fact that the deterioration rate varies depending on the season. For example, the deterioration prediction unit 103 predicts that the deterioration rate is higher than the baseline in a snowy season in early spring, a season with a large amount of rainfall, and a winter season.

A time at which the deterioration prediction unit 103 predicts the deterioration level is set to a certain time point after a sensor information acquisition date of the sensor history information. The deterioration prediction unit 103 may predict the deterioration level at a plurality of future time points in a range of, for example, a monthly, seasonal (quarterly), or yearly basis. The deterioration prediction unit 103 may predict the deterioration level at a future time point designated by the user.

The prediction of the deterioration level may be performed by other devices. The other devices predict the deterioration level at the prediction time point, and transmit the deterioration level to the deterioration prediction device 10. The deterioration prediction unit 103 acquires the deterioration level from the other devices, and decides the predicted deterioration level as a future deterioration level.

The output unit 104 outputs the deterioration prediction result of the structure predicted by the deterioration prediction unit 103. For example, when the deterioration prediction unit 103 predicts the deterioration state of the structure, the output unit 104 notifies the terminal device 540 of the deterioration prediction result of the structure. The output unit 104 may select a notification destination.

The output unit 104 may display the deterioration prediction result on the display of the terminal device 540 of the road administrator such as the local government, for example. The output unit 104 may display the deterioration prediction result of the structure at the prediction time point to be superimposed on the map.

Figure 3:
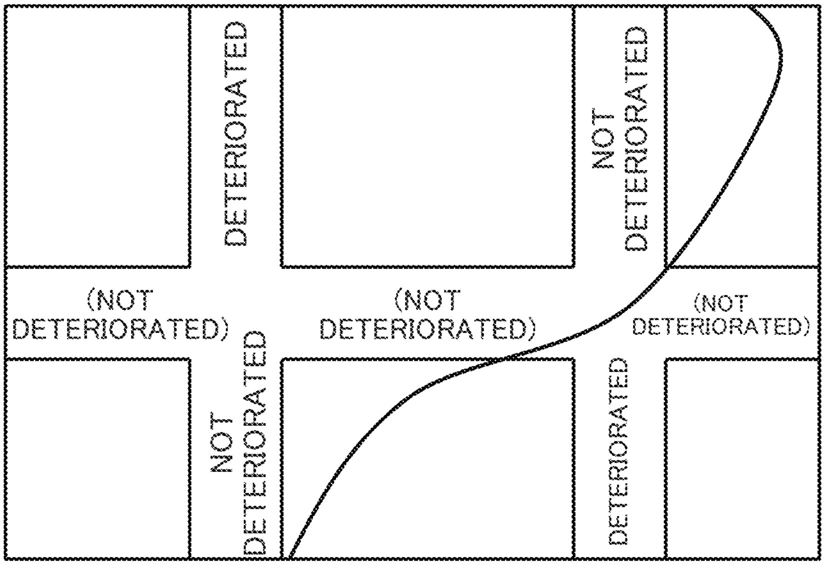
FIG. 3 is a diagram illustrating a deterioration state of a structure based on sensor history information on a map.
Figure 4:
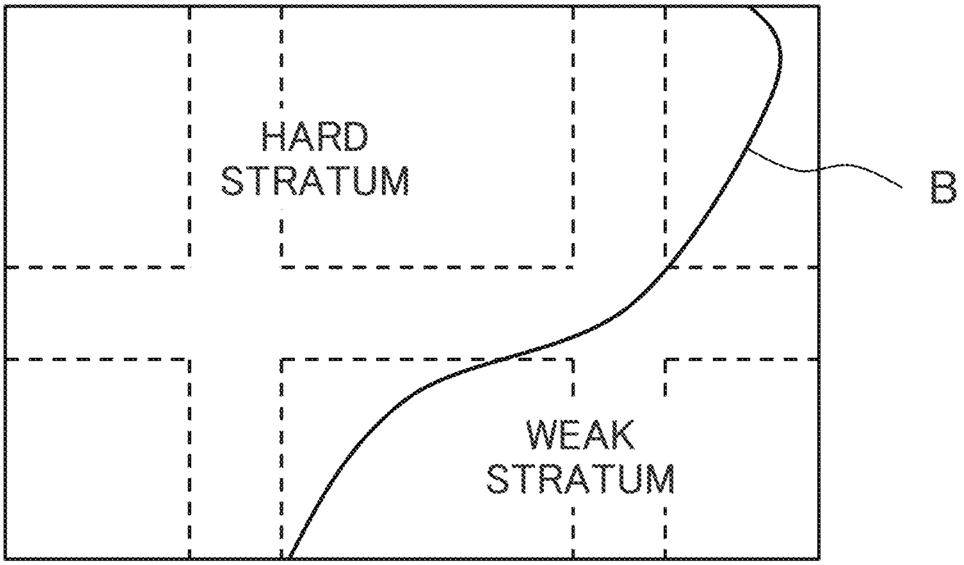
FIG. 4 is a diagram illustrating stratum information of ground under a structure on a map.

Here, a deterioration prediction method and a display method by the deterioration prediction unit 103 will be described with reference to the drawings. FIG. 3 is a diagram illustrating the deterioration state of the structure based on the sensor history information on the map. In FIG. 3, lines indicate the roads. In FIG. 3, "deteriorated" indicates an area where the structure is deteriorated, and "not deteriorated" indicates an area where the structure is not deteriorated. FIG. 4 is a diagram illustrating the stratum information of the ground under the structure on the map. As illustrated in FIG. 4, a hard stratum and a weak stratum are formed with a boundary line B as a boundary. The hard stratum and the weak stratum are classified by an index such as a converted N value. For example, typically, cohesive soils are classified as the weak ground if the converted N value is 3 or less, while sandy soils are classified as the weak ground if the converted N-value is 5 or less. However, the hard stratum and the weak stratum may be classified using an index other than the converted N value.

Figure 5:
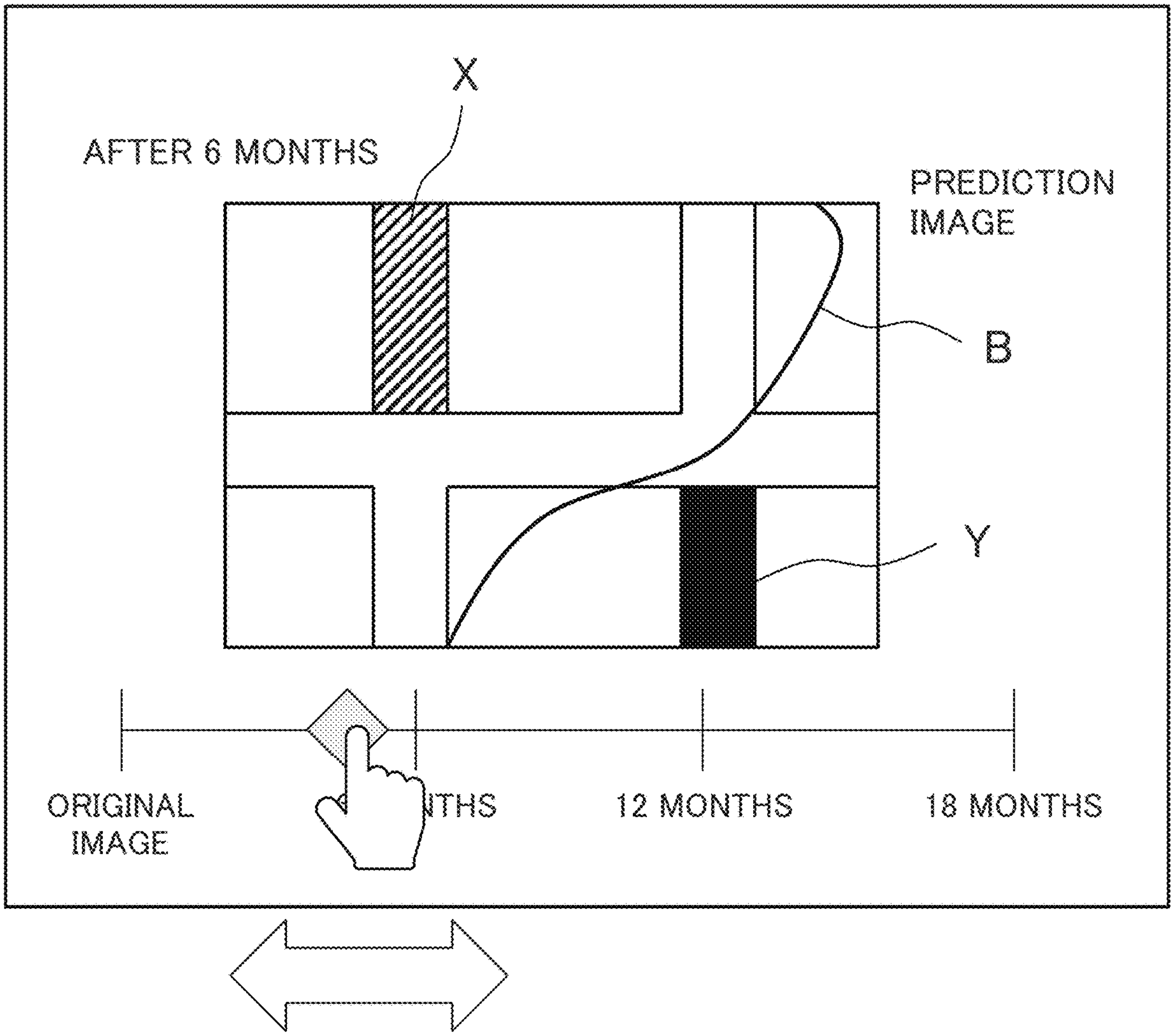
FIG. 5 is an example of a display screen of a deterioration level of a structure predicted by a deterioration prediction unit.

FIG. 5 is an example of the display screen of the deterioration level of the structure predicted by the deterioration prediction unit 103. In the example of FIG. 5, the deteriorated areas in FIG. 3 are illustrated in color with a different shade in accordance with the magnitude of the deterioration level after six months. That is, in FIG. 5, since the region indicated by X is a hard stratum, the deterioration level is equivalent to the baseline. On the other hand, since the region indicated by Y in FIG. 5 is a weak stratum, the deterioration level is higher than the baseline. The output unit 104 also causes an aspect of deterioration, which is associated with the deterioration level in a time selected from among the plurality of time points, to be displayed on the map. That is, as illustrated in FIG. 5, the output unit 104 may cause a slider bar and a slider to be displayed, and switch the deterioration prediction result of the prediction time to be displayed based on the position of the slider on the slider bar. In the example of FIG. 5, deterioration prediction results after 6 months, 12 months, and 18 months can be switched and displayed.

Figure 6:
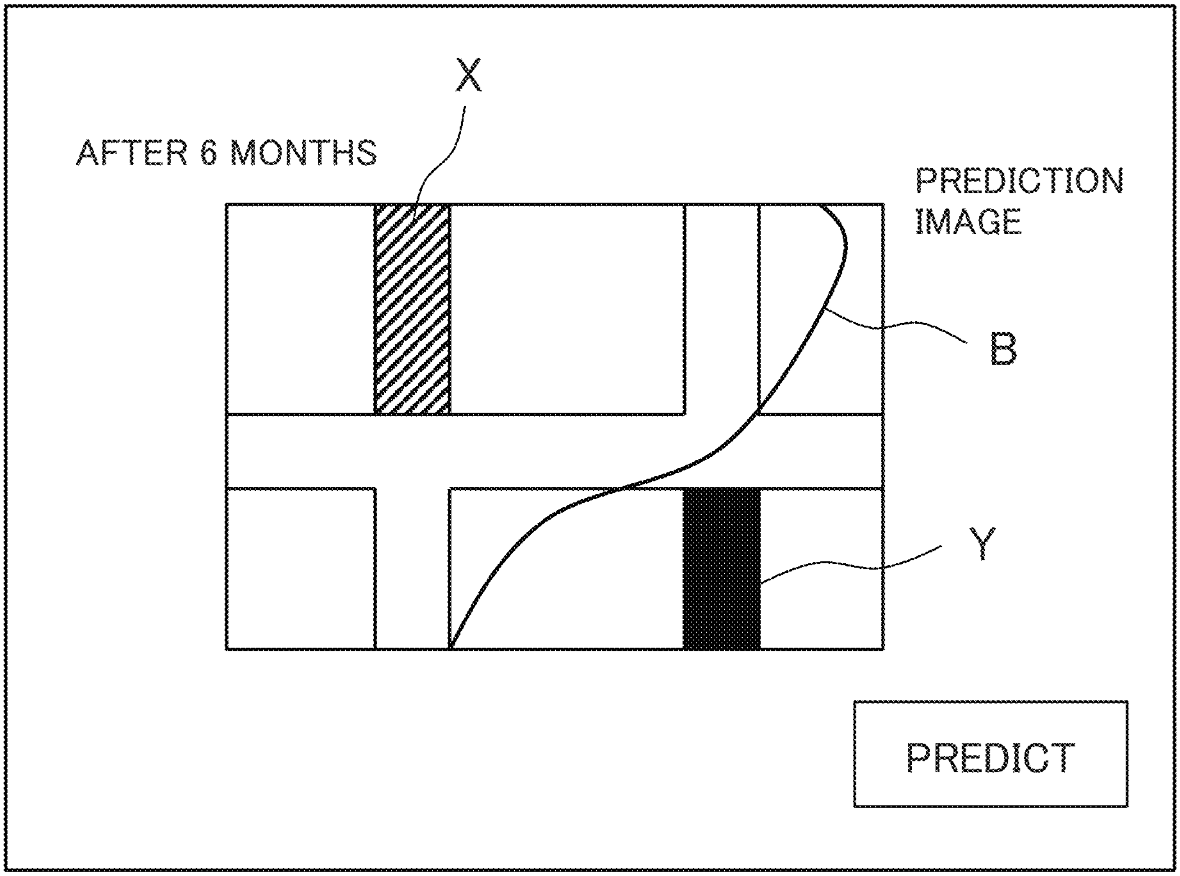
FIG. 6 is another example of a display screen of a deterioration level of a structure predicted by a deterioration prediction unit.

FIG. 6 is another example of the display screen of the deterioration level of the structure predicted by the deterioration prediction unit 103. The display screen in FIG. 6 includes a prediction button instead of switching the deterioration prediction result to be displayed based on the position of the slider as illustrated in FIG. 5. In a case in which the prediction button is pressed down in a state in which an original image is displayed, the deterioration prediction unit 103 may automatically switch the screen in such a way as to display the deterioration prediction result of the time in which the deterioration level is predicted to exceed a threshold value initially on the road in the display screen. As illustrated in FIG. 6, in a case in which the time in which the deterioration level is predicted to exceed the threshold value initially is six months later, the deterioration prediction unit 103 automatically switches to the screen of the deterioration prediction result after 6 months.

Figure 7:
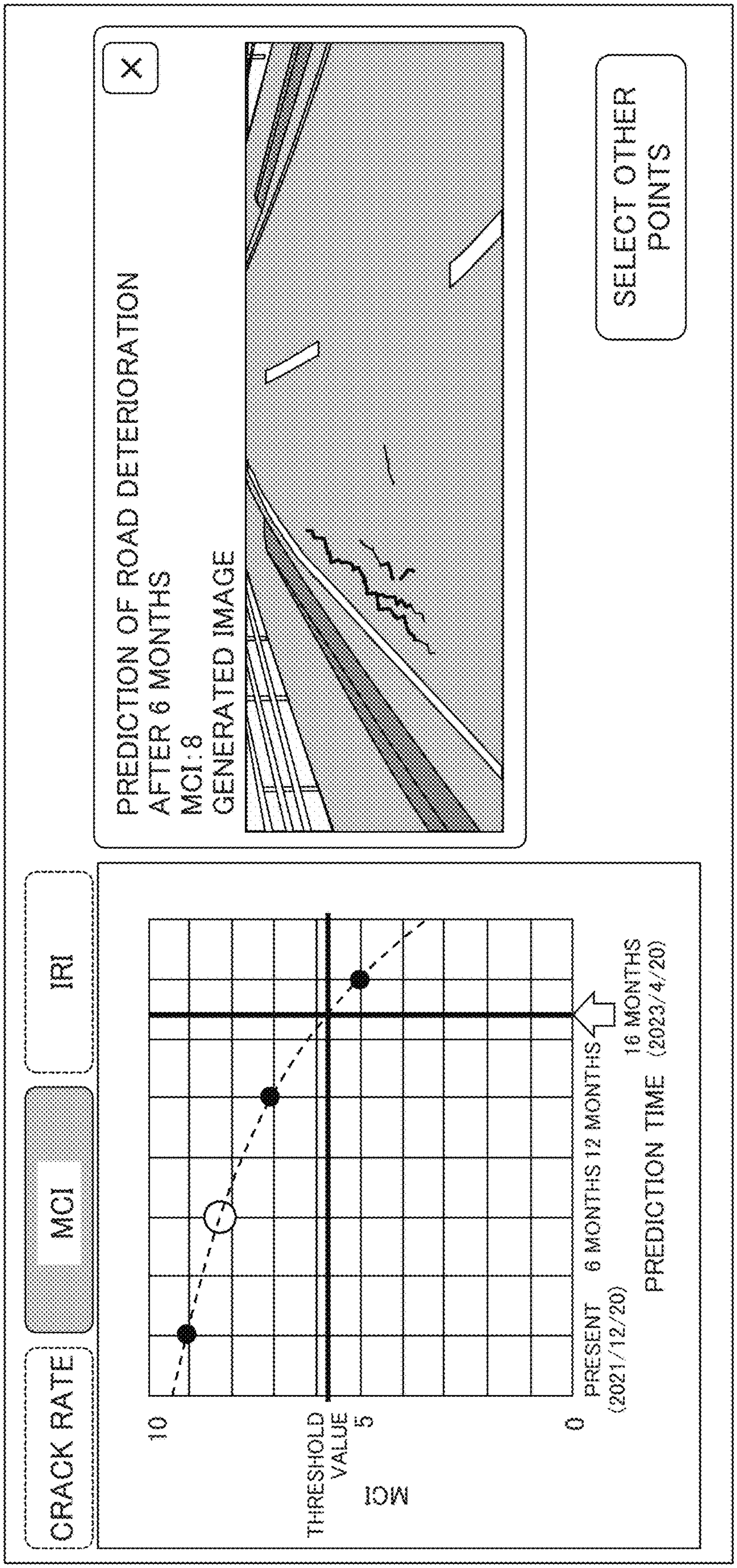
FIG. 7 is another example of a display screen of a deterioration level of a structure predicted by a deterioration prediction unit.

The output unit 104 may display a graph representing the prediction time and changes in the deterioration level together with the prediction image. FIG. 7 is another example of the display screen of the deterioration level of the structure predicted by the deterioration prediction unit 103. FIG. 7 includes a graph illustrating a relationship between the prediction time and the MCI. As illustrated in FIG. 7, the output unit 104 may display a correspondence relationship between the prediction image to be displayed and the position in the graph. For example, a plot on the graph associated with the prediction image to be displayed or a value on an axis may be displayed in a more emphasized manner than other plots or values. The output unit 104 may cause the threshold value of the deterioration level at which the structure needs to be repaired to be indicated on the graph.

As illustrated in FIG. 7, the output unit 104 may cause the time at which the deterioration level is predicted to exceed the threshold value and a date thereof to be displayed on the graph. In the example of FIG. 7, the time at which the deterioration level is predicted to exceed the threshold value is Apr. 20, 2023, which is 16 months later. The output unit 104 may change the color of the position on the graph associated with the time at which the deterioration level is predicted to exceed the threshold value, or highlight the position by displaying an icon or the like.

On the screen of FIG. 7, when the "cracking rate" or the "IRI" button may be pressed down, a graph relating to the prediction time and the cracking rate and a graph relating to the prediction time and the IRI may be displayed.

[Description of Operation]

Figure 8:
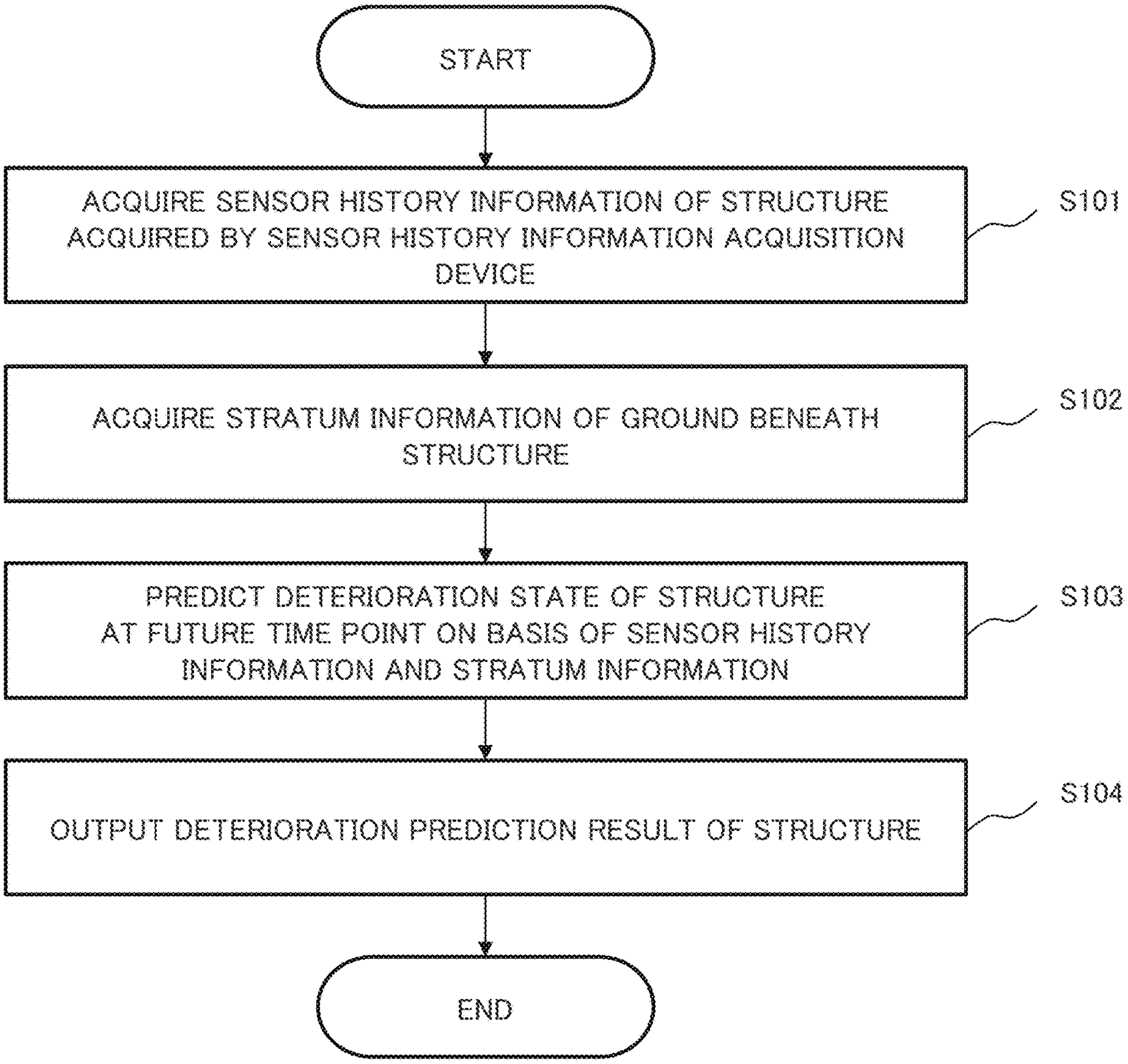
FIG. 8 is a flowchart illustrating an example of an operation of the deterioration prediction device according to the first example embodiment.

FIG. 8 is a flowchart illustrating an example of an operation of the deterioration prediction device 10 according to the first example embodiment. The sensor history information acquisition unit 101 acquires the sensor history information of the structure (step S101). The stratum information acquisition unit 102 acquires the stratum information of the ground under the structure (step S102). The deterioration prediction unit 103 predicts the deterioration state of the structure at a future time point based on the sensor history information and the stratum information (step S103). Next, the output unit 104 outputs the deterioration prediction result of the structure (step S104).

The deterioration prediction unit 103 of the deterioration prediction device 10 predicts the deterioration state of the structure at a future time point based on the sensor history information and the stratum information. As a result, the deterioration state of the structure can be predicted in consideration of not only the deterioration information of the structure surface but also the stratum information of the ground. Therefore, according to the deterioration prediction device 10, the appropriate deterioration prediction of the structure can be performed.

[Hardware Configuration]

Next, a hardware configuration of the deterioration prediction device 10 will be described. Components of the deterioration prediction device 10 may be configured by a hardware circuit. Alternatively, in the deterioration prediction device 10, the components may be configured using a plurality of devices connected via a network. For example, the deterioration prediction device 10 may be configured using cloud computing. Alternatively, in the deterioration prediction device 10, a plurality of components may be configured by one piece of hardware. Alternatively, the deterioration prediction device 10 may be implemented as a computer device including a central processing unit (CPU), a read only memory (ROM), and a random access memory (RAM). The deterioration prediction device 10 may be implemented as a computer device including a network interface circuit (NIC) in addition to the above configuration.

Figure 9:
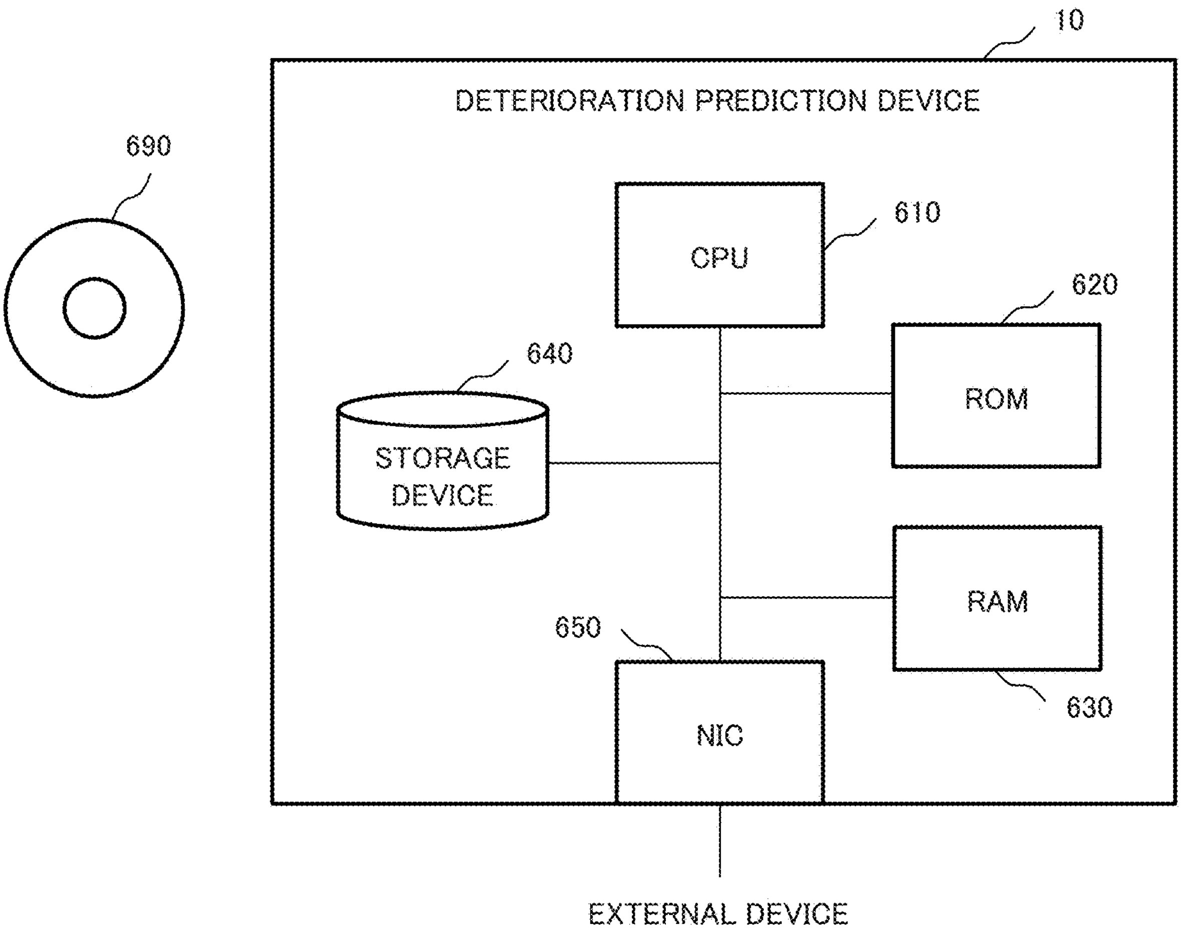
FIG. 9 is a block diagram illustrating an example of a hardware configuration of the deterioration prediction device according to the first example embodiment.

FIG. 9 is a block diagram illustrating an example of a hardware configuration of the deterioration prediction device 10. The deterioration prediction device 10 includes a CPU 610, a ROM 620, a RAM 630, a storage device 640, and an NIC 650, and constitutes a computer device. The CPU 610 reads a program from the ROM 620 and/or the storage device 640. Then, the CPU 610 controls the RAM 630, the storage device 640, and the NIC 650 based on the read program. Then, a computer including the CPU 610 controls these configurations such that the functions of the sensor history information acquisition unit 101, the stratum information acquisition unit 102, the deterioration prediction unit 103, and the output unit 104 illustrated in FIG. 1 are implemented.

When each function is implemented, the CPU 610 may use the RAM 630 or the storage device 640 as a temporary storage medium of a program and data. Alternatively, the CPU 610 may read the program included in the recording medium 690 having the program stored in a computer readable manner by using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores the programs and fixed data which are executed by the CPU 610. The ROM 620 is, for example, a programmable-ROM (P-ROM) or a flash ROM. The RAM 630 temporarily stores the programs and data which are executed by the CPU 610. The RAM 630 is, for example, a dynamic-RAM (D-RAM). The storage device 640 stores data and programs which are stored for a long time by the deterioration prediction device 10. The storage device 640 may operate as a temporary storage device of the CPU 610. The storage device 640 is, for example, a hard disk device, a magneto-optical disk device, a solid state drive (SSD), or a disk array device. The ROM 620 and the storage device 640 are non-transitory recording media. On the other hand, the RAM 630 is a transitory recording medium. The CPU 610 is operable based on a program stored in the ROM 620, the storage device 640, or the RAM 630. That is, the CPU 610 can operate using a non-transitory recording medium or a transitory recording medium.

The NIC 650 relays exchange of data with an external device (the drive recorder 520, the SAR 530, the terminal device 540, the vehicle 550, or the like) via a network. The NIC 650 is, for example, a local area network (LAN) card. The NIC 650 is not limited to wired one, and may be wireless one.

Second Example Embodiment

Next, a second example embodiment of the present disclosure will be described in detail with reference to the drawings. Hereinafter, description of contents overlapping with the above description will be omitted to the extent that description of the present example embodiment is not unclear.

Figure 10:
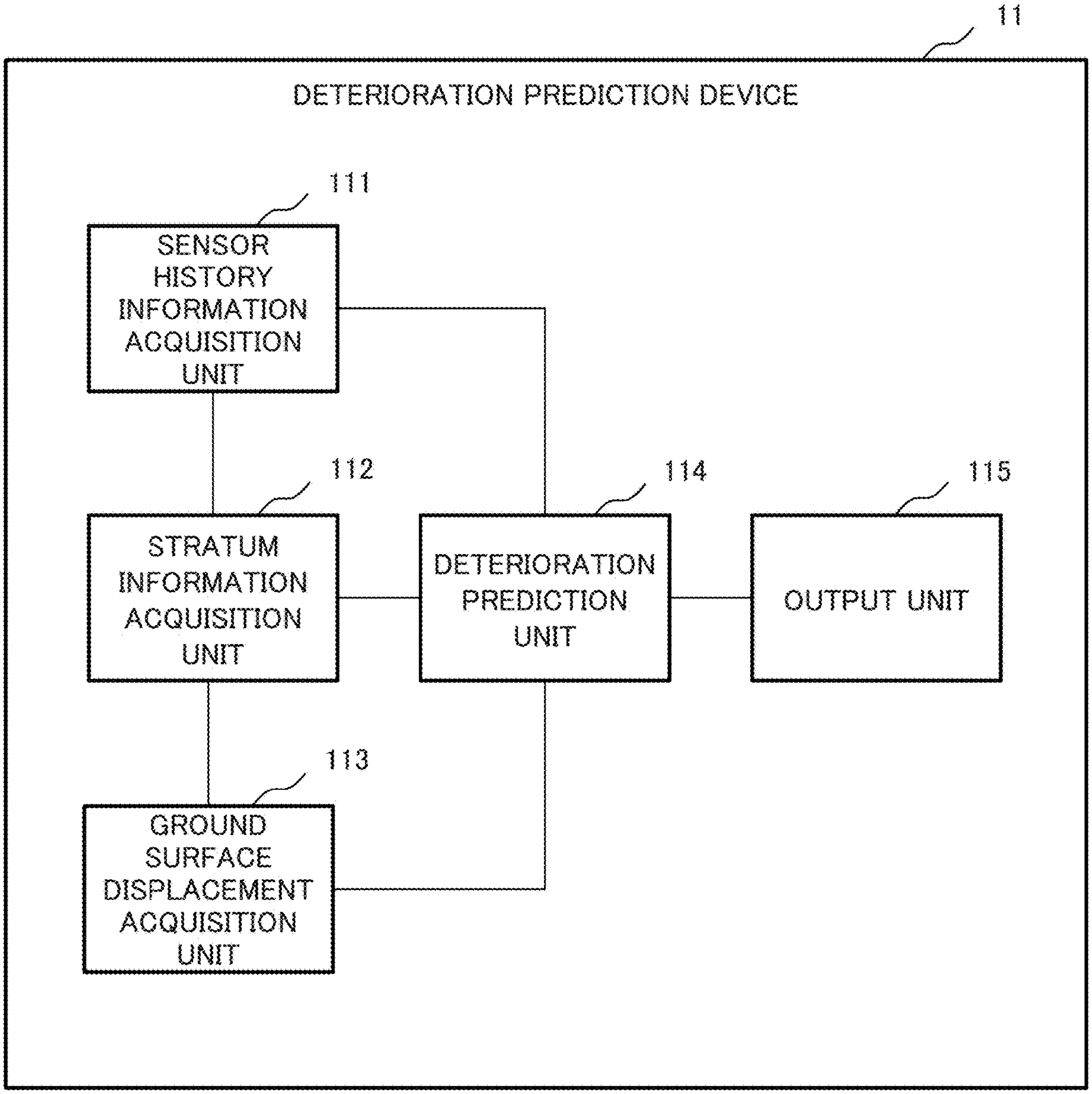
FIG. 10 is a block diagram illustrating an example of a configuration of a deterioration prediction device according to a second example embodiment.

FIG. 10 is a block diagram illustrating an example of a configuration of a deterioration prediction device 11 according to a second example embodiment. The deterioration prediction device 11 includes a sensor history information acquisition unit 111, a stratum information acquisition unit 112, a ground surface displacement acquisition unit 113, a deterioration prediction unit 114, and an output unit 115. The second example embodiment is different from the first example embodiment in that the ground surface displacement acquisition unit 113 is provided. Since the configurations of the sensor history information acquisition unit 111 and the stratum information acquisition unit 112 are similar to the associated configurations of the first example embodiment, the description thereof is omitted.

The ground surface displacement acquisition unit 113 acquires ground surface displacement by using a measurement image acquired from a ground surface measurement device. Specifically, the ground surface displacement acquisition unit 113 acquires an SAR image captured by the SAR 530, and analyzes the acquired SAR image and acquires the ground surface displacement. Alternatively, the ground surface displacement acquisition unit 113 may directly acquire the ground surface displacement obtained by analyzing the SAR image captured by the SAR 530. The ground surface displacement may include information on the ground surface conditions such as ground sinking and swelling or building construction and removal. The ground surface displacement acquisition unit 113 may acquire an observation result using multispectral from the SAR 530. In this case, the ground surface displacement acquisition unit 113 can analyze a type of ground surface in addition to the ground surface displacement using the acquired measurement image. The type of ground includes at least one of a water surface, mud, garbage, dry soil, grassland, forest, farmland, and snow cover. The ground surface displacement acquisition unit 113 may use displacement of an architectural structure such as a building. The ground surface displacement acquisition unit 113 may acquire the ground surface displacement using an SAR image stored in a cloud system configured using cloud computing to which the drive recorder 520 is connected. The ground surface displacement acquisition unit 113 outputs the acquired ground surface displacement to the deterioration prediction unit 114.

The deterioration prediction unit 114 evaluates deterioration of the structure based on the sensor history information, the stratum information, and the ground surface displacement. The deterioration prediction unit 114 predicts the deterioration state of the structure in consideration of the ground surface displacement in addition to the function of the deterioration prediction unit 103. For example, the deterioration prediction unit 114 predicts that the deterioration rate of the structure is higher as the ground surface displacement is larger than the prediction value, and predicts the deterioration state based on the deterioration rate. The deterioration prediction unit 114 may predict that the deterioration rate is higher than the baseline for ground surface portions where the ground surface displacement is rapidly occurring and the ground surface displacement exhibits non-linear movement even though the ground surface displacement is not larger than the prediction value.

The deterioration prediction result may include a disaster occurrence time. The deterioration prediction unit 114 may predict the disaster occurrence time based on the acquired sensor history information, the stratum information, and the ground surface displacement. For example, the deterioration prediction unit 114 can predict the time of occurrence of the disaster such as collapse of embankment, collapse of slope/cliff, or depression of the road bed or railroad bed of the road surface or the railway track based on the ground surface displacement. However, the depression is not limited to the sinking of the soil under the road surface, and the pothole on the road surface may increase to cause depression. In this case, the deterioration prediction unit 114 predicts the disaster occurrence time based on the sensor history information. In addition, the deterioration prediction unit 114 can predict the time of occurrence of a disaster such as collapse of a building, an elevated railway, an elevated road, or collapse of a bridge based on displacement of a portion which comes in contact with the ground surface such as a bridge, a bridge pier, or a foundation. The deterioration prediction unit 114 outputs the deterioration prediction result of the structure predicted as described above to the output unit 115.

The output unit 115 outputs the deterioration prediction result of the structure predicted by the deterioration prediction unit 114. The output destination and the output method are similar to those of the output unit 104 in the first example embodiment.

[Description of Operation]

Figure 11:
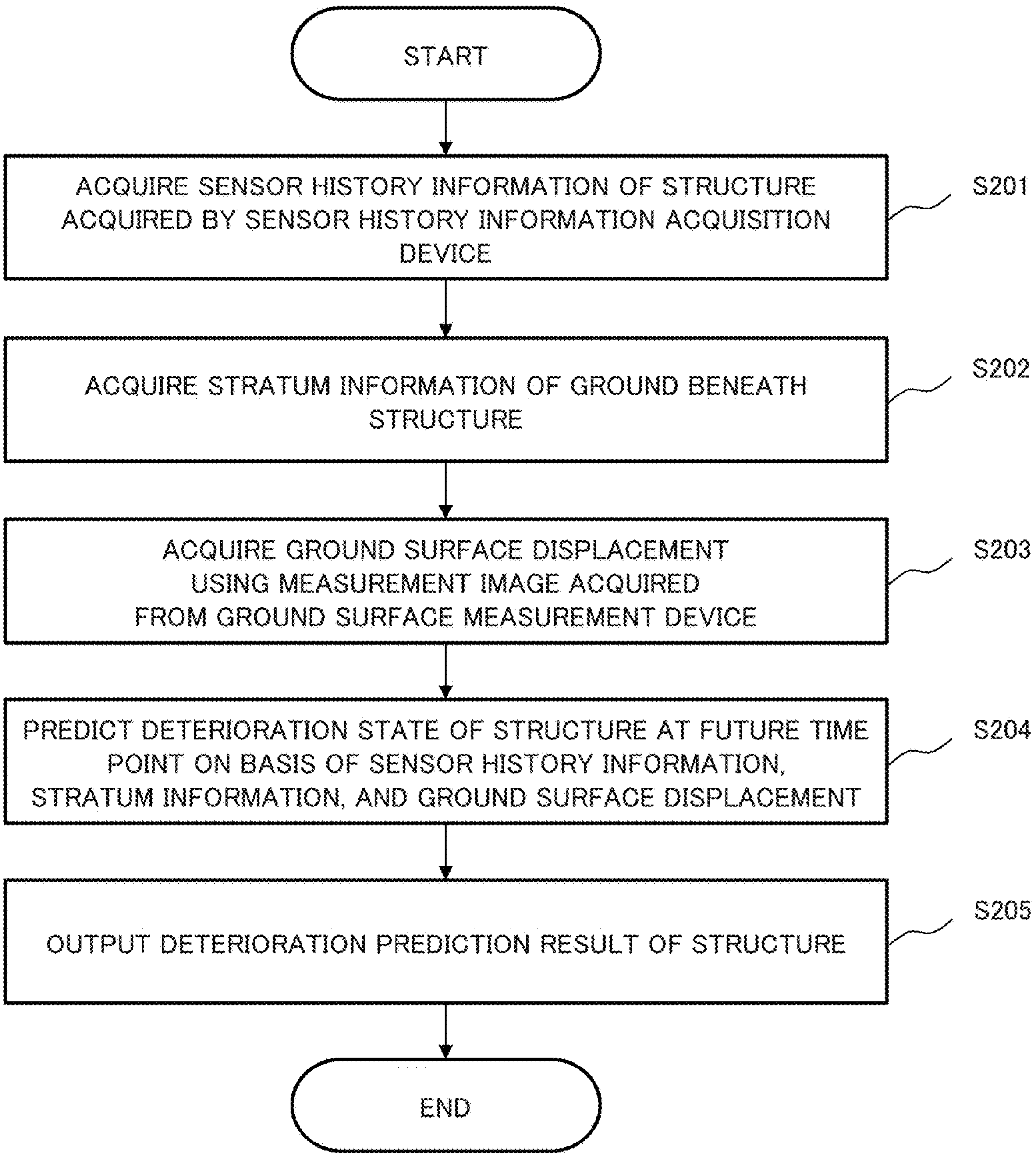
FIG. 11 is a flowchart illustrating an example of an operation of the deterioration prediction device according to the second example embodiment.

FIG. 11 is a flowchart illustrating an example of an operation of the deterioration prediction device 11 according to the second example embodiment. Since steps S201 to S202 in the present example embodiment are similar to steps S101 to S102 in the first example embodiment, description thereof is omitted. The ground surface displacement acquisition unit 113 acquires ground surface displacement by using a measurement image acquired from a ground surface measurement device (step S203). Next, the deterioration prediction unit 114 predicts the deterioration state of the structure at a future time point based on the sensor history information, the stratum information, and the ground surface displacement (step S204). Finally, the output unit 115 outputs the deterioration prediction result of the structure evaluated by the deterioration prediction unit 114 (step S205).

In the deterioration prediction device 11 according to the second example embodiment, the deterioration prediction unit 114 predicts the deterioration state of the structure at a future time point based on the ground surface displacement in addition to the sensor history information and the stratum information. As the deterioration is predicted using the dynamic information of the ground surface displacement, it is possible to predict the progress of future deterioration in detail. Therefore, it is possible to evaluate the deterioration state of the structure more accurately.

Some or all of the above example embodiments may be described as the following Supplementary Notes, but the present disclosure is not limited to the following Supplementary Notes.

(Supplementary Note 1)

A deterioration prediction device including:

a sensor history information acquisition means that acquires sensor history information of a structure;

a stratum information acquisition means that acquires stratum information of a ground under the structure;

a deterioration prediction means that predicts a deterioration state of a structure at a future time point based on the sensor history information and the stratum information; and an output means that outputs the deterioration prediction result of the structure.

(Supplementary Note 2)

The deterioration prediction device according to Supplementary Note 1, further including a ground surface displacement acquisition means for acquiring ground surface displacement using a measurement image acquired from a ground surface measurement device, wherein the deterioration prediction means predicts the deterioration state of the structure at the future time point based on the sensor history information, the stratum information, and the ground surface displacement.

(Supplementary Note 3)

The deterioration prediction device according to Supplementary Note 1 or 2, wherein, in a case in which the stratum information is a weak stratum, the deterioration prediction means predicts that deterioration at the future time point progresses more than a baseline.

(Supplementary Note 4)

The deterioration prediction device according to Supplementary Note 1 or 2, wherein, in a case in which the stratum information is a hard stratum, the deterioration prediction means predicts that deterioration at the future time point is equivalent to a baseline.

(Supplementary Note 5)

The deterioration prediction device according to any one of Supplementary Notes 1 to 4, wherein the deterioration prediction means predicts the deterioration state of the structure at the future time point by further using information regarding an environment of the structure acquired from a database.

(Supplementary Note 6)

The deterioration prediction device according to Supplementary Note 5, wherein the deterioration prediction means acquires weather information from the database and predicts the deterioration state of the structure.

(Supplementary Note 7)

The deterioration prediction device according to any one of Supplementary Notes 1 to 6, wherein the structure is a road, and the deterioration prediction means predicts a deterioration level of the road by using an index of at least one of a crack, a pothole, rutting, and flatness abnormality of the road at the future time point.

(Supplementary Note 8)

The deterioration prediction device according to Supplementary Note 7, wherein the deterioration prediction means predicts the deterioration level at a plurality of future time points, and the output means causes an aspect of deterioration, which is associated with the deterioration level at a time selected from the plurality of time points, to be displayed on a map.

(Supplementary Note 9)

The deterioration prediction device according to Supplementary Note 7, wherein the deterioration prediction means predicts the deterioration level at a plurality of future time points, and the output means displays a prediction image of the road, which is associated with the deterioration level at a time selected from the plurality of time points, and a graph representing a relationship between the plurality of future time points and the deterioration level.

(Supplementary Note 10)

A deterioration prediction method including:

acquiring sensor history information of a structure;

acquiring stratum information of a ground under the structure;

predicting a deterioration state of the structure at a future time point based on the sensor history information and the stratum information; and outputting a deterioration prediction result of the structure.

(Supplementary Note 11)

A recording medium having a program recorded therein, the program causing a computer to execute:

acquiring sensor history information of a structure;

acquiring stratum information of a ground under the structure;

predicting a deterioration state of the structure at a future time point based on the sensor history information and the stratum information; and outputting a deterioration prediction result of the structure.

Although the present invention has been described with reference to the example embodiments, the present invention is not limited to the above example embodiments.

Various modifications that can be understood by those skilled in the art can be made to the configuration or details of the present invention within the scope of the present invention.

REFERENCE SIGNS LIST

10, 11 deterioration prediction device
101, 111 sensor history information acquisition unit
102, 112 stratum information acquisition unit
103, 114 deterioration prediction unit
104, 115 output unit
113 ground surface displacement acquisition unit
510 computer
520 drive recorder
530 SAR
540 terminal device
550 vehicle
580 network
610 CPU
620 ROM
630 RAM
640 storage device
650 NIC

What is claimed is:

1. A deterioration prediction device comprising:
a memory storing instructions; and
at least one processor configured to execute the instructions to:
acquire sensor history information of a structure;
acquire stratum information of a ground under the structure;
predict a deterioration state of the structure at a future time point based on the sensor history information and the stratum information;
output a deterioration prediction result of the structure;
acquire ground surface displacement using a measurement image acquired from a ground surface measurement device; and
predict the deterioration state of the structure at the future time point based on the sensor history information, the stratum information, and the ground surface displacement.

2. The deterioration prediction device according to claim 1, wherein the at least one processor is further configured to execute the instructions to:
in a case in which the stratum information is a weak stratum, predict that deterioration at the future time point progresses more than a baseline.

3. The deterioration prediction device according to claim 1, wherein the at least one processor is further configured to execute the instructions to:
in a case in which the stratum information is a hard stratum, predict that deterioration at the future time point is equivalent to a baseline.

4. The deterioration prediction device according to claim 1, wherein the at least one processor is further configured to execute the instructions to:
predict the deterioration state of the structure at the future time point by further using information regarding an environment of the structure acquired from a database.

5. The deterioration prediction device according to claim 4, wherein the at least one processor is further configured to execute the instructions to:
acquire weather information from the database; and
predict the deterioration state of the structure.

6. The deterioration prediction device according to claim 1, wherein the structure is a road, and the at least one processor is further configured to execute the instructions to:
predict a deterioration level of the road by using an index of at least one of a crack, a pothole, rutting, and flatness abnormality of the road at the future time point.

7. The deterioration prediction device according to claim 6, wherein the at least one processor is further configured to execute the instructions to:
predict the deterioration level at a plurality of future time points; and
cause an aspect of deterioration, which is associated with the deterioration level at a time selected from the plurality of time points, to be displayed on a map.

8. The deterioration prediction device according to claim 6, wherein the at least one processor is further configured to execute the instructions to:
predict the deterioration level at a plurality of future time points; and
display a prediction image of the road, which is associated with the deterioration level at a time selected from the plurality of time points, and a graph representing a relationship between the plurality of future time points and the deterioration level.

9. A situation determination method comprising:
acquiring sensor history information of a structure;
acquiring stratum information of a ground under the structure;
predicting a deterioration state of the structure at a future time point based on the sensor history information and the stratum information;
outputting a deterioration prediction result of the structure;
acquiring ground surface displacement using a measurement image acquired from a ground surface measurement device; and
predicting the deterioration state of the structure at the future time point based on the sensor history information, the stratum information, and the ground surface displacement.

10. A non-transitory computer recording medium having a program recorded therein, the program causing a computer to execute:
acquiring sensor history information of a structure;
acquiring stratum information of a ground under the structure;
predicting a deterioration state of the structure at a future time point based on the sensor history information and the stratum information;
outputting a deterioration prediction result of the structure;
acquiring ground surface displacement using a measurement image acquired from a ground surface measurement device; and
predicting the deterioration state of the structure at the future time point based on the sensor history information, the stratum information, and the ground surface displacement.

* * * * *